(12) United States Patent
Itagaki

(10) Patent No.: US 9,902,396 B2
(45) Date of Patent: Feb. 27, 2018

(54) VEHICLE CONTROL APPARATUS

(71) Applicant: TOYOTA JIDOSHA KABUSHIKI KAISHA, Toyota-shi, Aichi-ken (JP)

(72) Inventor: Kenji Itagaki, Shizuoka-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 75 days.

(21) Appl. No.: 15/205,130

(22) Filed: Jul. 8, 2016

(65) Prior Publication Data

US 2017/0008516 A1 Jan. 12, 2017

(30) Foreign Application Priority Data

Jul. 10, 2015 (JP) ................................ 2015-138559

(51) Int. Cl.
*B60W 30/08* (2012.01)
*B60T 7/22* (2006.01)
*B60W 10/08* (2006.01)
*B60W 10/196* (2012.01)

(52) U.S. Cl.
CPC ............. *B60W 30/08* (2013.01); *B60T 7/22* (2013.01); *B60W 10/08* (2013.01); *B60W 10/196* (2013.01); *B60T 2201/024* (2013.01); *B60T 2210/36* (2013.01); *B60W 2030/082* (2013.01); *B60W 2550/10* (2013.01); *B60W 2600/00* (2013.01); *B60W 2710/081* (2013.01); *B60W 2710/18* (2013.01)

(58) Field of Classification Search
CPC .... B60W 30/08; B60W 10/08; B60W 10/196; B60W 2550/10; B60W 2030/082; B60W 2710/081; B60W 2710/18; B60W 2600/00; B60T 7/22; B60T 2210/36; B60T 2201/024
USPC .......................................................... 701/22
See application file for complete search history.

(56) References Cited

U.S. PATENT DOCUMENTS

| 5,448,479 | A  | * | 9/1995 | Kemner | ................... | B62D 1/28 |
|---|---|---|---|---|---|---|
|  |  |  |  |  |  | 180/167 |
| 6,038,502 | A  | * | 3/2000 | Sudo | ..................... | G01S 13/931 |
|  |  |  |  |  |  | 180/167 |
| 8,234,026 | B2 | * | 7/2012 | Wyatt | ....................... | B60L 3/00 |
|  |  |  |  |  |  | 180/65.8 |

(Continued)

FOREIGN PATENT DOCUMENTS

JP 2014-046870 A 3/2014
JP 2015-002627 A 1/2015

*Primary Examiner* — Jaime Figueroa
(74) *Attorney, Agent, or Firm* — Andrews Kurth Kenyon LLP

(57) ABSTRACT

A vehicle control apparatus includes a driving state determining portion configured to determine whether the vehicle is in a drivable state at a present time or will be in a drivable state at a point in time after a predetermined period of time has passed from the present time, based on data indicative of a positional relationship between the vehicle and a surrounding environment, that is used in the autonomous driving mode; and a rotation speed reducing portion configured to reduce a rotation speed of the electric motor when it is determined that the vehicle is in an undrivable state at the present time or will be in an undrivable state at the point in time after the predetermined period of time has passed, and the rotation speed of the electric motor is equal to or greater than a predetermined rotation speed.

6 Claims, 6 Drawing Sheets

(56) References Cited

U.S. PATENT DOCUMENTS

| | | | | |
|---|---|---|---|---|
| 2004/0210356 A1* | 10/2004 | Wilton | ............... | B60L 3/0046 |
| | | | | 701/22 |
| 2005/0029864 A1* | 2/2005 | Bauer | ............... | B60T 7/12 |
| | | | | 303/191 |
| 2009/0134820 A1* | 5/2009 | Sugiyama | ............... | B60K 6/445 |
| | | | | 318/66 |
| 2009/0248231 A1* | 10/2009 | Kamiya | ............... | G05D 1/0061 |
| | | | | 701/23 |
| 2013/0116876 A1* | 5/2013 | Park | ............... | B60L 3/00 |
| | | | | 701/22 |
| 2016/0200317 A1* | 7/2016 | Danzl | ............... | B60K 28/06 |
| | | | | 701/25 |

* cited by examiner

VEHICLE CONTROL APPARATUS

INCORPORATION BY REFERENCE

The disclosure of Japanese Patent Application No. 2015-138559 filed on Jul. 10, 2015 including the specification, drawings and abstract is incorporated herein by reference in its entirety.

BACKGROUND OF THE INVENTION

1. Field of the Invention

The invention relates to the technical field of a vehicle control apparatus that executes control when a vehicle has become undrivable.

2. Description of Related Art

One such apparatus is known that executes safety control when a vehicle has become undrivable due to a collision or the like. For example, Japanese Patent Application Publication No. 2014-046870 (JP 2014-046870 A) describes technology that, in a hybrid vehicle, increases the rotational resistance of an engine and quickly reduces the rotation speed of a motor when a collision of the vehicle is detected. Also, Japanese Patent Application Publication No. 2015-002627 (JP 2015-002627 A) describes technology that predicts a collision of a vehicle and stops a motor in advance.

If a vehicle overturns (rolls over) when a driver is performing a driving operation, operation (rotation) of the motor should stop as a result of the driving operation being interrupted. However, in a vehicle in which automated driving is possible, the motor may be operating (rotating) irrespective of any operation by the driver. Therefore, if the vehicle ends up overturning during automated driving, power for driving the motor may continue to be supplied even after the vehicle has overturned, and the wheels may continue to spin.

If the wheels continue to spin even after the vehicle has overturned, they may be a hindrance when a person escapes from the vehicle cabin or when a rescuer approaches the vehicle, for example. Also, even if the wheels do not spin, if high voltage for driving the motor continues to be applied after the vehicle has overturned, electrical shock may ensue or there may be discharge sparks depending on the state of the vehicle.

SUMMARY OF THE INVENTION

The invention thus provides a vehicle control apparatus capable of placing a vehicle that has become undrivable during automated driving, in a safe state.

One aspect of the invention relates to a vehicle control apparatus that controls a vehicle that is provided with an electric motor as a power source and is able to realize an automated driving mode in which autonomous driving without input from a driver is possible. This vehicle control apparatus includes a driving state determining portion configured to determine whether the vehicle is in a drivable state at a present time or will be in a drivable state at a point in time after a predetermined period of time has passed from the present time, based on data indicative of a positional relationship between the vehicle and a surrounding environment, that is used in the autonomous driving mode, and a rotation speed reducing portion configured to reduce a rotation speed of the electric motor when it is determined that the vehicle is in an undrivable state at the present time or will be in an undrivable state at the point in time after the predetermined period of time has passed, and the rotation speed of the electric motor is equal to or greater than a predetermined rotation speed.

The vehicle according to this aspect of the invention is a vehicle provided with an electric motor as a power source, such as a hybrid vehicle (HV), a plug-in hybrid vehicle (PHV), or an electric vehicle (EV), for example. Also, the vehicle according to this aspect of the invention is a vehicle that, in particular, is able to realize an automated driving mode in which autonomous driving without input from a driver is possible. In the autonomous driving mode, driving control of the vehicle is performed automatically based on information obtained from various sensors, onboard cameras, and GPS (Global Positioning System) and the like, for example.

The vehicle control apparatus according to this aspect of the invention is an apparatus that executes vehicle control in the automated driving mode described above, and may take the form of any of a variety of computer systems or the like such as various controllers or microcomputer devices, or various processing units such as one or a plurality of ECUs (Electronic Control Unit), that may include, as appropriate, one or a plurality of CPUs (Central Processing Units), MPUs (Micro Processing Units), and various processors or various controllers, or also various storing means such as ROM (Read Only Memory), RAM (Random Access Memory), and buffer memory or flash memory, for example.

When the vehicle control apparatus according to this aspect of the invention is operating, first, it is determined by the determining portion whether the vehicle is in a drivable state at the present time or will be in a drivable state at a point in time after a predetermined period of time has passed from the present time. A drivable state in this case refers to a state in which the vehicle is literally able to continue to drive. The vehicle is determined to be in the drivable state (i.e., not in an undrivable state) when automated driving is performed without any trouble. However, the vehicle may be determined to be in an undrivable state due to the vehicle overturning due to an unexpected obstacle or the like, or driving over an unexpected obstacle or the like, for example. In this way, it may be said that the determining portion is a portion for determining an unexpected undrivable state.

The determining portion determines whether the vehicle is in a drivable state based on data indicative of the positional relationship between the vehicle and the surrounding environment, that is used in the autonomous driving mode. That is, the determining portion determines whether the vehicle is in a drivable state using data obtained for automated driving of the vehicle. The determining portion compares information indicative of the orientation of the vehicle with information indicative of the environment around the vehicle, and determines that the vehicle is in an undrivable state when the inclination of the vehicle is abnormal (for example, when the axis of a normal direction orthogonal to a longitudinal (front-rear) direction and a lateral (right-left) direction of the vehicle is greatly inclined), for example.

The determining portion is able to not only determine whether the vehicle is in an undrivable state at the present time, but also whether the vehicle will be in an undrivable state at a point in time after a predetermined period of time has passed from the present time, based on data that is used for automated driving described above. More specifically, if an unexpected obstacle (such as an oncoming vehicle or a pedestrian that has rushed into the street, for example) is able to be detected, a collision or rollover or the like thereafter is able to be predicted, so it is possible to determine whether the vehicle will be in an undrivable state at the point in time after the predetermined period of time has passed. In this way, the effect of being able to predict the state of the vehicle in the future is a beneficial one that can be expected as a result of using the data used for automated driving.

When it is determined by the determining portion that the vehicle is in an undrivable state or will be in an undrivable state after a predetermined period of time, and the rotation speed of the electric motor is equal to or greater than the predetermined rotation speed, the rotation speed of the electric motor is reduced by the rotation speed reducing portion. The predetermined rotation speed in this case is a threshold value for determining whether the rotation speed of the electric motor is high enough to cause a case that will be described later, when the vehicle is in the undrivable state. A suitable value is obtained through simulation or the like beforehand and set as this predetermined rotation speed. The rotation speed reducing portion reduces the rotation speed of the electric motor so that it becomes at least less than a predetermined rotation speed, but the rotation speed reducing portion may also completely stop rotation of the electric motor. The specific method for reducing the rotation speed is not particularly limited. Any well-known technology or the like may be suitably applied.

Here, if the rotation speed of the electric motor were to be equal to or higher than the predetermined rotation speed even after the vehicle has come to be in an undrivable state, the driving wheels of the overturned vehicle would continue to spin, and thereby end up impeding an attempt of a person to escape from the vehicle cabin or efforts by a rescuer, for example. Also, even if driving force is not output, if high voltage for driving the electric motor continues to be applied, electrical shock may ensue or there may be discharge sparks.

However, with this aspect of the invention, when it is determined that the vehicle is in an undrivable state and the rotation speed of the electric motor is equal to or greater than the predetermined rotation speed, the rotation speed of the electric motor is reduced. Therefore, cases such as that described above are able to be better avoided. If the driver is performing a driving operation in the vehicle, the driving operation would stop when the vehicle becomes undrivable, so it is thought that the rotation speed of the electric motor would decrease automatically to the predetermined rotation speed or below. However, in the automated driving mode, the electric motor is operated without any operation by the driver, so even if the vehicle becomes undrivable, there is a possibility that the rotation speed of the electric motor will be maintained. Therefore, control to reduce the rotation speed of the electric motor when the vehicle is undrivable as described above is extremely effective in a vehicle capable of realizing automated driving.

As described above, with the vehicle control apparatus according to this aspect of the invention, a vehicle that has become undrivable during automated driving is able to be placed in a safer state.

In the above aspect, the rotation speed reducing portion may include at least one of a command portion configured to apply a command value that makes a rotation speed target value of the electric motor less than the predetermined rotation speed, a brake that decelerates the electric motor by friction force, and an opening portion configured to disengage a relay of a drive circuit of the electric motor.

When the rotation speed reducing portion has the command portion, and the vehicle is in an undrivable state and the rotation speed of the electric motor is equal to or greater than the predetermined rotation speed, a command value that makes the rotation speed target value of the electric motor less than the predetermined rotation speed is applied. As a result, the rotation speed of the electric motor is reliably reduced to less than the predetermined value.

When the rotation speed reducing portion has the brake, and the vehicle is in an undrivable state and the rotation speed of the electric motor is equal to or greater than the predetermined rotation speed, the rotation of the electric motor is decelerated by generating friction force on a driveshaft to which driving force from the electric motor is transmitted, for example.

When the rotation speed reducing portion has the opening portion, and the vehicle is in an undrivable state and the rotation speed of the electric motor is equal to or greater than the predetermined rotation speed, a relay of a drive circuit of the electric motor is disengaged so power stops being supplied to the electric motor.

When the rotation speed reducing portion has two or more of the command portion, the brake, and the opening portion described above, the rotation speed reducing portion may also reduce the rotation speed of the electric motor by using these in combination.

In the above aspect, the undrivable state may be a state in which any one driving wheel of the vehicle is not in contact with a road surface for equal to or greater than a first predetermined period of time, or a state in which the vehicle has contacted another object and been rendered undrivable.

In a state in which any one driving wheel of the vehicle is not continuously contacting a road surface for equal to or greater than a first predetermined period of time, or a state in which the vehicle has contacted another object and been rendered undrivable, the likelihood that the vehicle will be able to recover to a drivable state is low, and it is also highly likely that the driving wheel will continue to spin due to the fact that the electric motor will continue to operate. In this aspect, the rotation speed of the electric motor is reduced in a situation in which a case such as that described above may easily occur. Therefore, the vehicle is able to be very effectively placed in a safe state.

The first predetermined period of time in this aspect is a threshold value set such that a state in which a driving wheel of the vehicle that is traveling normally ends up temporarily coming off of the road surface, for example, will not be erroneously determined to be an undrivable state.

In the above aspect, the driving state determining portion may be configured to determine that the vehicle is undrivable when an axis in a normal direction is deviating by a predetermined value or more, in a coordinate system based on orientation of the vehicle and a coordinate system based on a traveling road surface of the vehicle.

According to this aspect, when determining whether the vehicle is in a drivable state, a coordinate system based on the orientation of the vehicle and a coordinate system based on a traveling road surface of the vehicle are used. The coordinate system based on the orientation of the vehicle is a coordinate system in which a longitudinal (front-rear) direction of the vehicle is an X axis, a lateral (right-left) direction is a Y axis, and a direction orthogonal to both the X axis and the Y axis is a Z axis, for example. This coordinate system is obtained using GPS and various sensors and the like, for example. On the other hand, the coordinate system based on the traveling road surface of the vehicle is a coordinate system in which the advancing direction when the road surface on which the vehicle is traveling is a plane is an X axis, a direction orthogonal to the X axis on the plane is a Y axis, and a direction orthogonal to both the X axis and the Y axis is a Z axis, for example.

This coordinate system is obtained based on map data and the like stored in advance, for example.

Here, in particular, when the vehicle becomes undrivable as a result of rolling over, the axis in the normal direction (i.e., the Z axis in the example described above) of the coordinate system that is based on the orientation of the vehicle is greatly inclined. As a result, in the coordinate system based on the orientation of the vehicle and the coordinate system based on the traveling road surface of the vehicle, a relatively large deviation occurs in the axis in the normal direction. Using this, the driving state determining portion determines that the vehicle is largely inclined and in an undrivable state when the axis in the normal direction is deviating by a predetermined value or more.

The predetermined value in this case is a threshold value for determining that the vehicle is inclined to an extent that is inconceivable when driving normally. An optimum value is obtained through simulation or the like, for example, in advance and is set as the predetermined value.

As described above, it is possible to easily and accurately determine whether the vehicle is in a drivable state by using the coordinate system based on the orientation of the vehicle and the coordinate system based on the traveling road surface of the vehicle.

In the above aspect in which the determination as to whether the vehicle is undrivable is made based on deviation of the axis in the normal direction described above, the driving state determining portion may be configured to determine that the vehicle is undrivable when the state in which the axis in the normal direction is deviating by the predetermined value or more continues for a second predetermined period of time or longer.

In this case, the vehicle will not immediately be determined to be in the undrivable state even if the axis in the normal direction of the coordinate system based on the orientation of the vehicle and the coordinate system based on the traveling road surface of the vehicle is deviating by the predetermined value or more. Therefore, the vehicle may be determined to be in a drivable state even if the axis in the normal direction of coordinate systems is deviating by the predetermined value or more.

The vehicle is determined to be undrivable in this aspect when the state in which the axis in the normal direction of the coordinate systems is deviating by the predetermined value or more continues for the second predetermined period of time or longer. The second predetermined period of time in this case is a threshold value for determining whether the vehicle is unable to recover from an inclined state. An optimum value is obtained through simulation or the like beforehand, and is set as this second predetermined period of time, for example.

Deviation in the axis in the normal direction of the coordinate system based on the orientation of the vehicle and the coordinate system based on the traveling road surface of the vehicle may occur due to temporary inclination of the vehicle due to bumps and dips in the traveling road surface or momentary erroneous measurement of a coordinate system as a result of noise or the like, for example. Therefore, if the vehicle were to immediately be determined to be in an undrivable state when the axis in the normal direction of the coordinate systems is deviating by the predetermined value or more, the rotation speed of the electric motor may end up being reduced even though the vehicle is in a drivable state.

In contrast, an erroneous determination due to the temporary deviation described above can be prevented by using the condition that the state in which the axis of the coordinate systems is deviating by the predetermined value or more continue for the second predetermined period of time or longer. As a result, the driving state of the vehicle is able to be more accurately determined.

In the above aspect in which the determination as to whether the vehicle is undrivable is made based on the continuance of the state in which the axis of the coordinate systems is deviating by the predetermined value or more for the second predetermined period of time or longer described above, the driving state determining portion may be configured to shorten the second predetermined period of time the greater the deviation of the axis in the normal direction is.

In this case, for example, the second predetermined period of time is set shorter when the deviation of the axis in the normal direction of the coordinate system based on the orientation of the vehicle and the coordinate system based on the traveling road surface of the vehicle significantly exceeds the predetermined value. That is, the vehicle will be determined to be undrivable even if the period of time during which the axis of the coordinate systems is deviating by the predetermined value or more is a relatively short period of time. Therefore, if the vehicle is so far inclined that it is inconceivable that the vehicle will recover, it will be determined at a relatively early stage that the vehicle is undrivable. As a result, the rotation speed of the electric motor is able to be quickly reduced so the vehicle is able to be placed in a safe state early on.

On the other hand, the second predetermined period of time is set longer when the deviation of the axis in the normal direction of the coordinate system based on the orientation of the vehicle and the coordinate system based on the traveling road surface of the vehicle slightly exceeds the predetermined value. That is, if the period of time during which the axis of the coordinate systems is deviating by the predetermined value or more is has continued for a sufficiently long period of time, it will be determined that the vehicle is undrivable. Therefore, if the amount that the vehicle is inclined is small enough so that it is conceivable that the vehicle will likely recover, it will not be determined that the vehicle is undrivable unless a relatively long period of time passes. As a result, it is possible to prevent the vehicle from erroneously being determined to be in an undrivable state even though it is in a drivable state, and consequently, prevent the rotation speed of the electric motor from being needlessly reduced.

The degree to which the second predetermined period of time is changed according to the amount of deviation of the coordinate systems may be determined using a map or the like obtained through simulation or the like beforehand, for example. Also, the degree to which the second predetermined period of time is changed may be adjusted according to the environment around the vehicle (such as the state of the road surface on which the vehicle is traveling, for example).

This operation and other advantages of the invention will be made apparent from the example embodiments described below.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, example embodiments of the vehicle control apparatus will be described with reference to the accompanying drawings. In the example embodiments, a hybrid vehicle is given as one example of the vehicle of the invention.

<Structure of Hybrid Vehicle>

First, the structure of the hybrid vehicle V according to the example embodiment will be described with reference to FIG. 1. Here, FIG. 1 is a block view of the structure of the hybrid vehicle according to this example embodiment.

Figure 1:
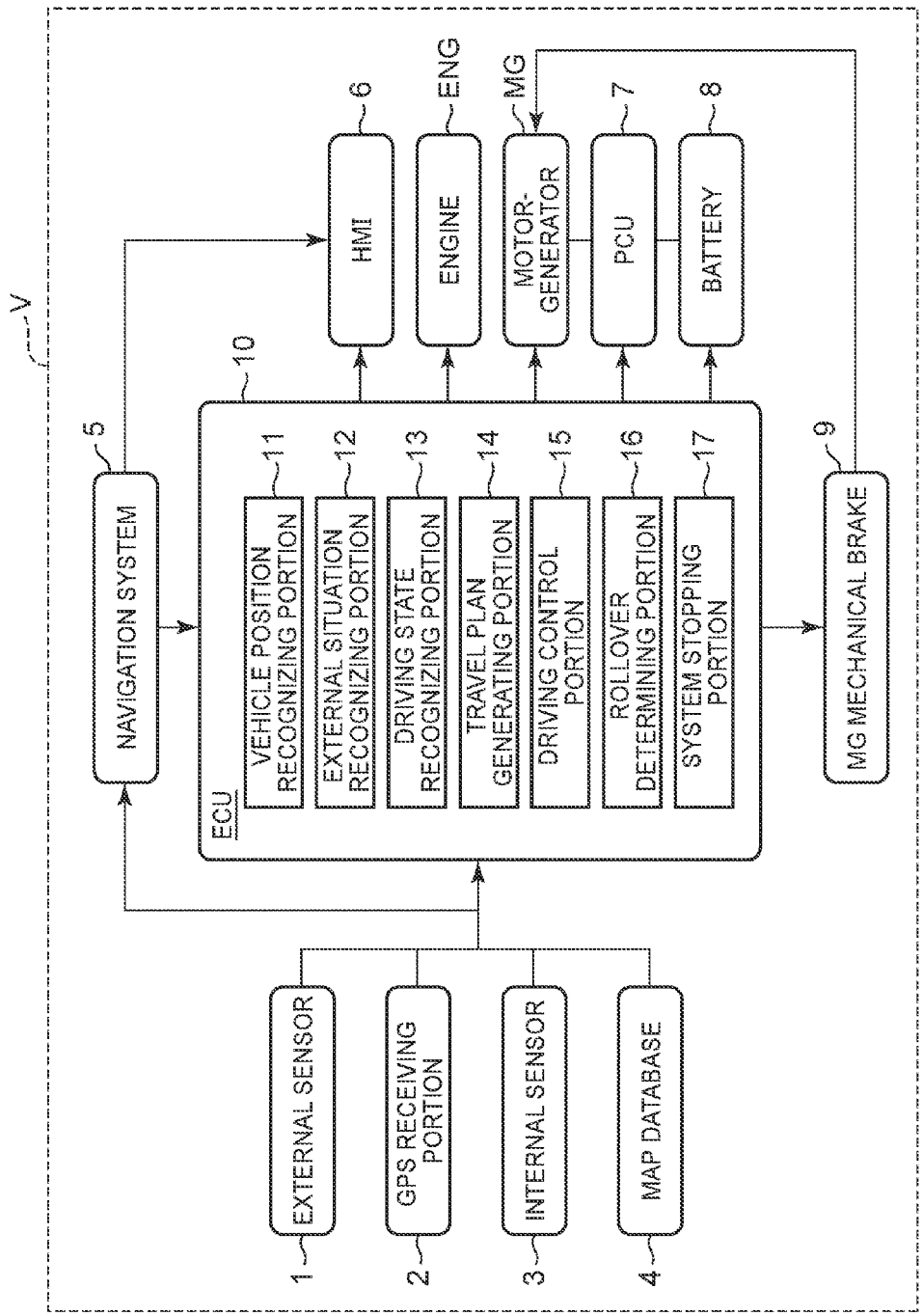
FIG. 1 is a block diagram of the structure of a hybrid vehicle according to one example embodiment.

As shown in FIG. 1, the hybrid vehicle V according to this example embodiment includes an engine ENG and a motor-generator MG as power sources, an external sensor 1, a GPS receiving portion 2, an internal sensor 3, a map database 4, a navigation system 5, an HMI (Human Machine Interface) 6, a PCU (Power Control Unit) 7, a battery 8, an MG mechanical brake 9, and an ECU (Electronic Control Unit) 10.

The engine ENG is the main power source of the hybrid vehicle V, and drives the hybrid vehicle V by burning a fuel such as gasoline or light oil. The engine ENG is also able to function as a power source for rotating (i.e., driving) a rotating shaft of the motor-generator MG that will be described later.

The motor-generator MG functions as a power source of the hybrid vehicle V together with the engine ENG. The motor-generator MG is connected to the engine ENG via a power split device (e.g., a planetary gear unit), not shown. The motor-generator MG also has a regenerative function in which it converts driving force of the hybrid vehicle V into electric power. The motor-generator MG is configured to be able to input/output electric power from/to the battery 8 via the PCU 7. The motor-generator MG is one specific example of an "electric motor".

The external sensor 1 is a detecting apparatus that detects an external situation that is information regarding the area surrounding the hybrid vehicle V. The external sensor 1 is formed by a camera, radar, or LIDER (Laser Imaging Detection and Ranging) or the like, for example. Information detected by the external sensor 1 is output to the ECU 10.

The GPS receiving portion 2 measures a position of the hybrid vehicle V (e.g., the longitude and latitude of the vehicle V) by receiving a signal from a GPS satellite. The GPS receiving portion 2 then transmits the measured position information of the hybrid vehicle V to the ECU 10. Other means capable of identifying the position of the hybrid vehicle V may also be used instead of the GPS receiving portion 2. Also, the GPS receiving portion 2 is also able to measure the orientation of the hybrid vehicle V when the GPS receiving portion 2 has a plurality of antennas that receive signals from the GPS satellite.

The internal sensor 3 is a detecting apparatus that detects the running state of the hybrid vehicle V. The internal sensor 3 is formed by a vehicle speed sensor, an acceleration sensor, or a yaw rate sensor, or the like, for example. Information detected by the internal sensor 3 is output to the ECU 10.

The map database 4 is a database that includes map information. The map database 4 is created in a HDD (Hard Disk Drive) mounted in the hybrid vehicle V, for example. The map information includes various information, such as information regarding the positions of roads, information regarding road shape (e.g., classifications of curves and straight portions, and the curvatures of curves and the like), as well as information regarding the positions of intersections and branch points. Further, the map information preferably includes output signals from the external sensor 1 in order to use SLAM (Simultaneous Localization and Mapping) technology and information regarding the positions of blocking structures such as buildings and walls. The map database 4 may also be stored in a computer in a facility such as an information processing center capable of communicating with the hybrid vehicle V.

The navigation system 5 is a system that guides a driver of the hybrid vehicle V to a destination set by the driver of the hybrid vehicle V. The navigation system 5 calculates a route to be taken by the hybrid vehicle V based on the position information of the hybrid vehicle V measured by the GPS receiving portion 2 and the map information in the map database 4. The route may be a route that specifies a suitable lane in a section with a plurality of lanes. The navigation system 5 calculates a target route from the position of the hybrid vehicle V to the destination, and notifies the driver of the target route by a display on a display or by sound output from a speaker, for example. The navigation system 5 transmits information regarding the target route of the hybrid vehicle V to the ECU 10, for example. The navigation system 5 may be stored in a computer in a facility such as an information processing center capable of communicating with the hybrid vehicle V.

The HMI 6 is an interface through which information is input to the vehicle control apparatus by an occupant (including the driver) of the hybrid vehicle V, as well as output from the vehicle control apparatus to the occupant. The HMI 6 includes a display panel for displaying image information to the occupant, a speaker for outputting sound, and an operating button or a touch panel for the occupant to perform an input operation, for example. When an input operation related to activating or stopping automated driving is performed by the occupant, the HMI 6 outputs a signal to the ECU 10 and starts or stops automated driving. When the hybrid vehicle V has reached the destination where automated driving ends, the HMI 6 notifies the occupant that the hybrid vehicle V has arrived at the destination. The HMI 6 may also output information to the occupant using a handheld terminal that is wirelessly connected, and/or may receive an input operation from the occupant using the handheld terminal.

The PCU 7 is a unit that controls the input/output of power to/from the battery 8 and the motor-generator MG. The PCU 7 includes an inverter, a converter, and an SMR and the like. The inverter both converts direct current (DC) power drawn from the battery 8 into alternating current (AC) power and supplies this AC power to the motor-generator MG and converts AC power generated by the motor-generator MG into DC power and supplies this DC power to the battery 8. The converter steps the voltage of the power up or down. The SMR selectively transmits or cuts off power.

The battery 8 is formed as a chargeable power supply such as a lithium-ion battery, for example. The battery 8 is a power supply that supplies power for driving the motor-generator MG to the motor-generator MG. The battery 8 is also able to charge power generated by the motor-generator MG. The battery 8 may also be charged by receiving a supply of power from a power supply outside the hybrid vehicle V. That is, the hybrid vehicle V may also be a so-called plug-in hybrid vehicle.

The MG mechanical brake 9 is a brake capable of decelerating rotational motion of the motor-generator MG in response to a command from the ECU 10. The MG mechanical brake 9 decelerates the rotational motion of the motor-generator MG by, for example, generating friction force on a shaft that is connected to the rotating shaft of the motor-generator MG.

The ECU 10 is one specific example of the "vehicle control apparatus", and is an electronic control unit configured to be able to control the overall operation of the hybrid vehicle V. The ECU 10 according to this example embodiment is configured to be able to execute a safety control routine during automated driving of the hybrid vehicle V by a logical or physical processing block realized within the ECU 10, in particular. The specific structure of the ECU 10 will be described in detail later.

<Structure of the ECU>

As shown in FIG. 1, the ECU 10 includes a vehicle position recognizing portion 11, an external situation recognizing portion 12, a driving state recognizing portion 13, a travel plan generating portion 14, a driving control portion 15, a rollover determining portion 16, and a system stopping portion 17.

The vehicle position recognizing portion 11 recognizes the position of the hybrid vehicle V (hereinafter, simply referred to as "vehicle position) on the map based on the position information of the hybrid vehicle V received by the GPS receiving portion 2 and the map information in the map database 4. The vehicle position recognizing portion 11 may also recognize the vehicle position by obtaining the vehicle position used by the navigation system 5 from the navigation system 5. If the vehicle position of the hybrid vehicle V is able to be measured by a sensor arranged outside such as on a road, the vehicle position may also be obtained by communication from this sensor.

The external situation recognizing portion 12 recognizes the external situation of the hybrid vehicle V based on detection results of the external sensor 1 (e.g., image information from a camera or obstacle information from a laser or LIDER). The external situation includes road width and the position of a lane center or a white line of a traffic lane with respect to the hybrid vehicle V, the shape of the road (e.g., the curvature of the traveling lane, changes in the gradient of the road surface effective for estimating the line-of-sight of the external sensor 1, undulations, and the like), and the situation regarding obstacles around the hybrid vehicle V (e.g., information distinguishing fixed obstacles from moving obstacles, the position of an obstacle with respect to the hybrid vehicle V, the direction of movement of an obstacle with respect to the hybrid vehicle V, and the relative speed of the obstacle with respect to the hybrid vehicle V). Also, the accuracy of the direction and position of the hybrid vehicle V obtained by the GPS receiving portion 2 and the like may be increased by checking the detection results of the external sensor 1 against the map information.

The driving state recognizing portion 13 recognizes the driving state of the hybrid vehicle V based on the detection results of the internal sensor 3 (e.g., vehicle speed information from a vehicle speed sensor, acceleration information from an acceleration sensor, and yaw rate information from a yaw rate sensor and the like). The driving state of the hybrid vehicle V includes the vehicle speed, the acceleration, and the yaw rate, for example.

The travel plan generating portion 14 generates a course for the hybrid vehicle V based on the target route calculated by the navigation system 5, the vehicle position recognized by the vehicle position recognizing portion 11, and the external situation (including the vehicle position and orientation) of the hybrid vehicle V recognized by the external situation recognizing portion 12, for example. The course is a path that the hybrid vehicle V will take along the target route. The travel plan generating portion 14 generates a course such that the hybrid vehicle V will run suitably according to standards for driving efficiency, compliance with laws and regulations, and safety and the like, along the target route. It goes without saying that at this time the travel plan generating portion 14 generates a course for the hybrid vehicle V that avoids contact with obstacles, based on the situation regarding obstacles around the hybrid vehicle V.

The travel plan generating portion 14 generates a travel plan according to the generated course. That is, the travel plan generating portion 14 generates a travel plan along a target route set in advance, based on at least the external situation that makes up the information regarding the area around the hybrid vehicle V and the map information in the map database 4. The travel plan may also be data indicative of the vehicle speed, acceleration and deceleration, and changes in steering torque and the like of the hybrid vehicle V when the hybrid vehicle V travels the course along the target route. The travel plan may also include a speed pattern, an acceleration/deceleration pattern, and a steering pattern of the hybrid vehicle V. The travel plan generating portion 14 here may also generate a travel plan with the shortest trip time (i.e., the required time that it takes until the hybrid vehicle V arrives as the destination).

A speed pattern is data of a target vehicle speed set linked to a time at each target control position, for target control positions that are set at predetermined intervals (e.g., 1 m intervals) on the course), for example. An acceleration/deceleration pattern is data of a target acceleration/deceleration set linked to a time at each target control position, for target control positions set at predetermined intervals (e.g., 1 m intervals) on the course, for example. A steering pattern is data of target steering torque set linked to a time at each target control position, for target control positions set at predetermined intervals (e.g., 1 m intervals) on the course, for example.

The driving control portion 15 automatically controls the driving of the hybrid vehicle V based on the travel plan generated by the travel plan generating portion 14. The driving control portion 15 outputs a control signal according to the travel plan to each portion of the hybrid vehicle V. As a result, the driving control portion 15 controls the driving of the hybrid vehicle V such that the hybrid vehicle V automatically drives following the travel plan.

The rollover determining portion 16 is one specific example of "driving state determining means", and determines whether the hybrid vehicle V has overturned and is in an undrivable state. The rollover determining portion 16 determines whether the hybrid vehicle V is overturned (rolled over) based on the vehicle position of the hybrid vehicle V recognized in the vehicle position recognizing portion 11, the external situation of the hybrid vehicle V recognized by the external situation recognizing portion 12, and the driving state of the hybrid vehicle V recognized in the driving state recognizing portion 13, for example. A specific rollover determining method by the rollover determining portion 16 will be described in detail later.

The system stopping portion 17 executes a hybrid vehicle V system stopping process (more specifically, a process for stopping the speed of the motor-generator MG), in response to the hybrid vehicle V overturning (rolling over) and being in an undrivable state. The specific content of the process executed by the system stopping portion 17 will be described in detail later.

<Automated Driving Control Routine>

Next, an automated driving control routine executed by the ECU 10 that is the vehicle control apparatus according to this example embodiment will be described with reference to FIG. 2. Here, FIG. 2 is a flowchart illustrating an automated driving routine executed by the vehicle control apparatus according to this example embodiment.

Figure 2:
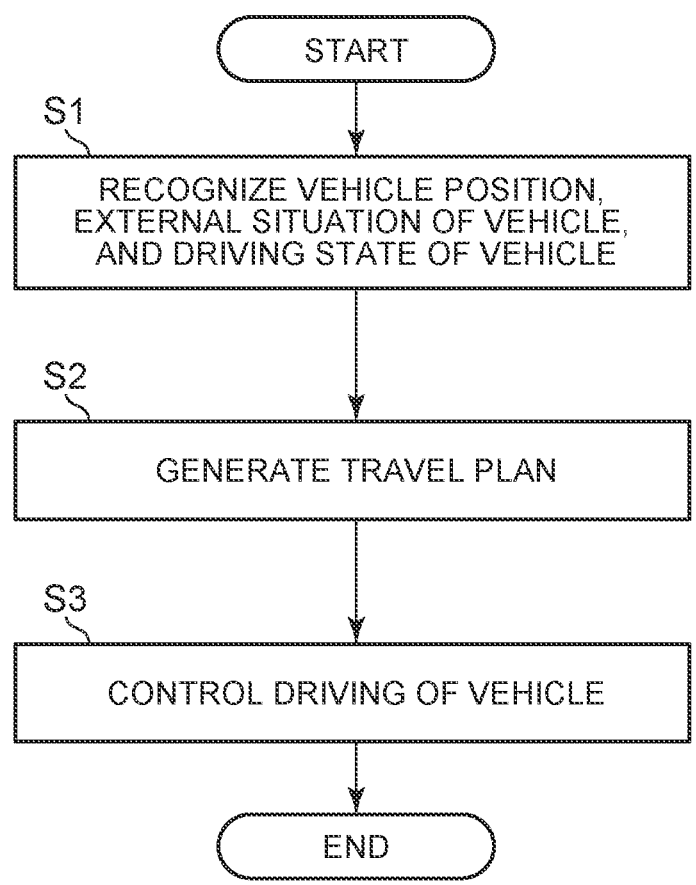
FIG. 2 is a flowchart illustrating an automated driving routine executed by a vehicle control apparatus according to the example embodiment.

In FIG. 2, the ECU 10 repeatedly executes the automated driving routine described below at predetermined intervals when the driver sets a destination with the navigation system 5 and performs an input operation with the HMI 6 to start automated driving.

First, the vehicle position of the hybrid vehicle V is recognized by the vehicle position recognizing portion 11 from the map information in the map database 4 and the position information of the hybrid vehicle V received by the GPS receiving portion 2. Also, the external situation of the hybrid vehicle V is recognized by the external situation recognizing portion 12 from the detection results of the external sensor 1. Moreover, the driving state of the hybrid vehicle V is recognized by the driving state recognizing portion 13 from the detection results of the internal sensor 3 (step S1).

Continuing on, a travel plan of the hybrid vehicle V is generated by the travel plan generating portion 14 from the driving state, external situation, and vehicle position of the hybrid vehicle V recognized in step S1, together with the target route of the navigation system 5 (step S2).

Then, driving of the hybrid vehicle V is controlled by the driving control portion 15 such that the hybrid vehicle V travels following the generated travel plan (step S3). When step S3 ends, the ECU 10 moves on to the automated driving control routine of the next cycle.

As a result of the automated driving control routine described above, when the hybrid vehicle V has reached the destination, automated driving ends. Alternatively, automated driving also ends when an input operation to stop automated driving is performed with the HMI 6 by the driver while the automated driving control routine is being executed.

<Safety Control Routine>

Figure 3:
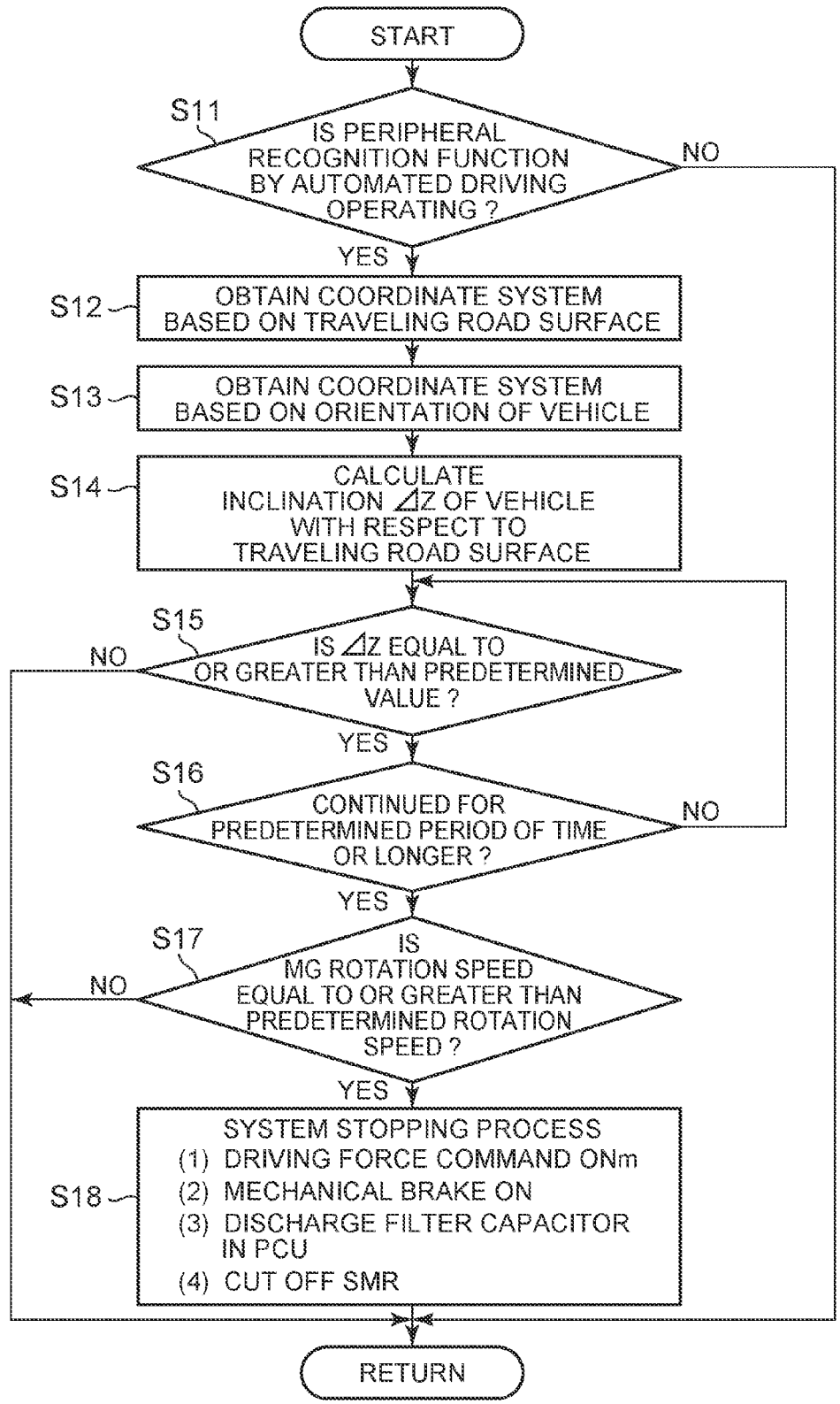
FIG. 3 is a flowchart illustrating a safety control routine executed by the vehicle control apparatus according to the example embodiment.

Next, a safety control routine executed by the ECU 10 that is the vehicle control apparatus according to this example embodiment will be described with reference to FIGS. 3 to 5. Here, FIG. 3 is a flowchart illustrating the safety control routine executed by the vehicle control apparatus according to this example embodiment. Also, FIG. 4 is a perspective view illustrating two coordinate systems used during automated driving, and FIG. 5 is a perspective view illustrating the difference between the two coordinate systems when the vehicle overturns.

As shown in FIG. 3, the ECU 10 executes the safety control routine to ensure safety when the hybrid vehicle V is in an undrivable state while the automated driving control routine already described above is being executed. In the ECU 10, in order to determine whether the safety control routine is able to be executed, a determination is made as to whether a peripheral recognition function by automated driving is operating (step S11). More specifically, a determination is made as to whether the vehicle position is recognized by the vehicle position recognizing portion 11, the external situation is recognized by the external situation recognizing portion 12, and the driving state is recognized by the driving state recognizing portion 13. If it is determined that the peripheral recognition function by automated driving is not operating (i.e., NO in step S11), the subsequent steps are skipped.

If it is determined that the peripheral recognition function by automated driving is operating (i.e., YES in step S11), a coordinate system based on the traveling road surface on which the hybrid vehicle V is traveling (hereinafter, this coordinate system will simply be referred to as "traveling road surface coordinate system") is obtained by the external situation recognizing portion 12, for example (step S12). Also, a coordinate system based on the orientation of the hybrid vehicle V (hereinafter, this coordinate system will simply be referred to as "vehicle coordinate system") is obtained by the vehicle position recognizing portion 11, for example (step S13).

Figure 4:
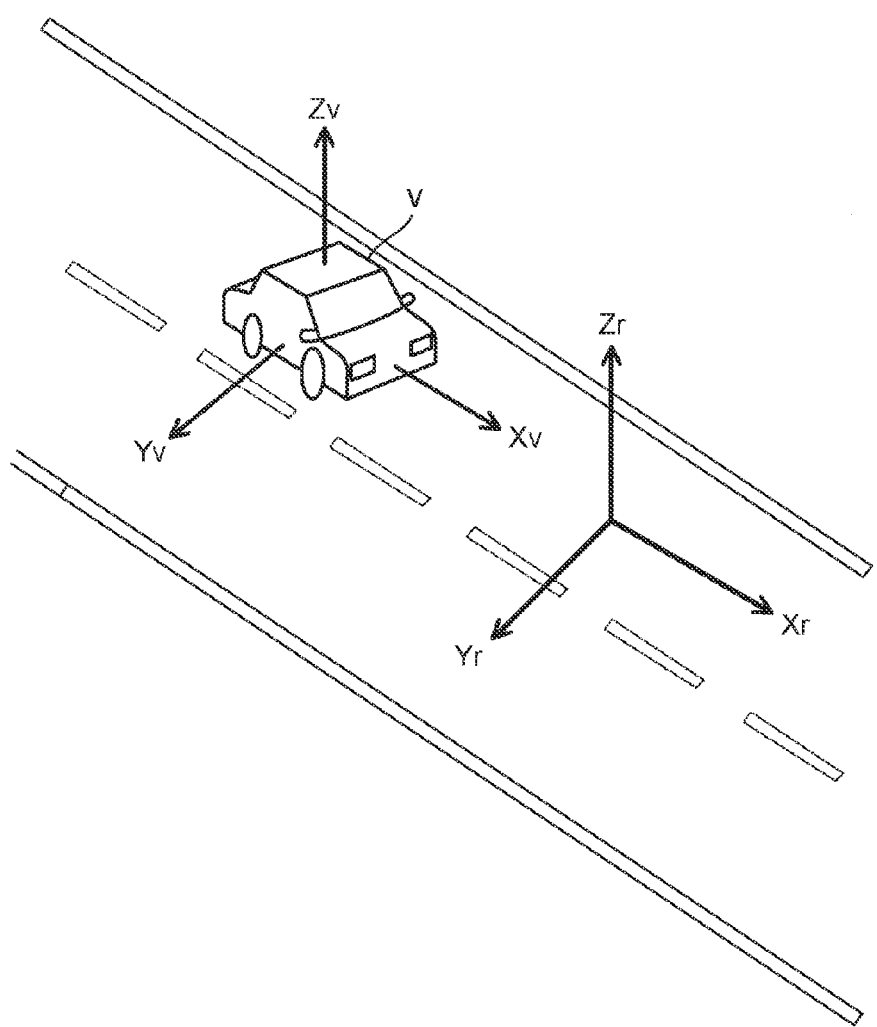
FIG. 4 is a perspective view of two coordinate systems used during automated driving.
Figure 5:
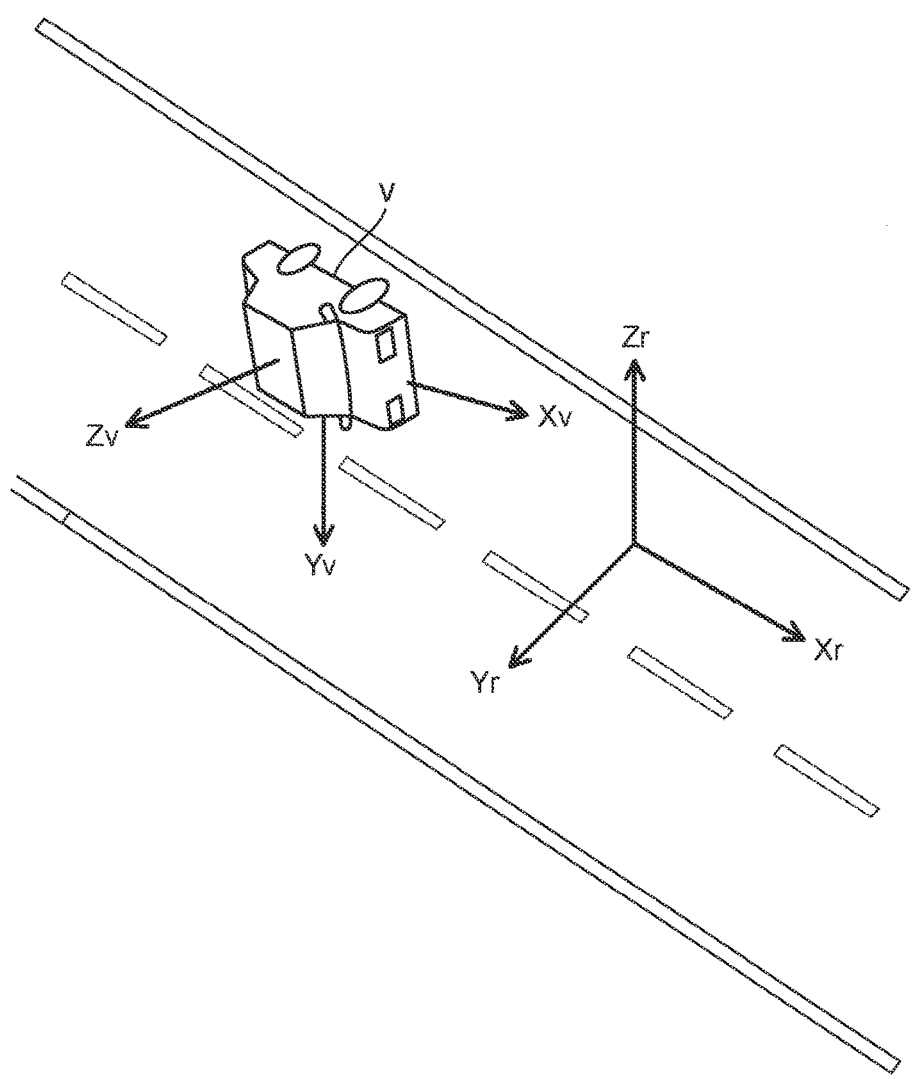
FIG. 5 is a perspective view of a difference between the two coordinate systems when the vehicle overturns.

As shown in FIG. 4, the traveling road surface coordinate system is a coordinate system in which the advancing direction when the road surface on which the hybrid vehicle V is traveling is a plane is an Xr axis, a direction orthogonal to the Xr axis on the plane is a Yr axis, and a direction orthogonal to both the Xr axis and the Yr axis is a Zr axis. The traveling road surface coordinate system is obtained based on the map data stored in the map database 4 and the like, for example.

On the other hand, the vehicle coordinate system is a coordinate system in which a longitudinal (front-rear) direction of the hybrid vehicle V is a Xv axis, a lateral (right-left) direction is a Yv axis, and a direction orthogonal to both the Xv axis and the Yv axis is a Zv axis. The vehicle coordinate system is obtained based on the detection results of the external sensor 1 and the internal sensor 3, and the receiving results of the GPS receiving portion 2 and the like, for example.

As is evident from the drawings, when the hybrid vehicle V is driving normally, the traveling road surface coordinate system and the vehicle coordinate system substantially match. That is, there is not much deviation between the Xr axis and the Xv axis. Similarly, there is not a large difference between the Yr axis and the Yv axis, as well as between the Zr axis and the Zv axis. However, if the hybrid vehicle V unexpectedly becomes undrivable, a large deviation between the traveling road surface coordinate system and the vehicle coordinate system may occur.

As shown in FIG. 5, when the hybrid vehicle V overturns (i.e., rolls over), the vehicle coordinate system consequently deviates greatly from the traveling road surface coordinate system. Here, in particular, when the hybrid vehicle V overturns, the Zv axis that lies in the normal direction of the vehicle coordinate system deviates greatly from the Zr axis that is the axis in the normal direction of the traveling road surface coordinate system. Therefore, in this example embodiment, rollover of the hybrid vehicle V is determined based on the amount of the deviation between the Zv axis of the vehicle coordinate system and the Zr axis of the traveling road surface coordinate system.

Returning now to FIG. 3, in the rollover determining portion 16, a difference $\Delta Z$ between the Zv axis of the vehicle coordinate system and the Zr axis of the traveling road surface coordinate system is calculated in order to determine rollover of the hybrid vehicle V (step S14). Then, in the rollover determining portion 16, it is determined whether ΔZ is equal to or greater than a predetermined value (step S15). The predetermined value is a threshold value for determining that the vehicle is inclined (i.e., tilted) to a degree that is inconceivable for normal driving. The predetermined value is set to a value that takes into account a margin for temporary inclination of the hybrid vehicle V due to bumps and dips and the like on the road surface, for example.

If ΔZ is not equal to or greater than the predetermined value (i.e., NO in step S15), it is determined that the hybrid vehicle V is not overturned, and the subsequent steps are skipped. On the other hand, if ΔZ is equal to or greater than the predetermined value (i.e., YES in step S15), it is determined that there is a possibility that the hybrid vehicle V is overturned, so it is further determined whether the state in which ΔZ is equal to or greater than the predetermined value is continuing for equal to or longer than a predetermined period of time (step S16). The predetermined period of time is one specific example of a "second predetermined period of time", and is a threshold value for determining whether the hybrid vehicle V is unable to recover from the inclined state. The predetermined period of time is set so that temporary inclination of the hybrid vehicle V will not later be determined as a rollover.

If it is determined that the state in which ΔZ is equal to or greater than the predetermined value is not continuing for equal to or greater than the predetermined period of time (i.e., NO in step S16), step S15 is executed again. Therefore, if the state in which ΔZ is equal to or greater than the predetermined value has not continued for the predetermined period of time and ΔZ is less than the predetermined value, the subsequent steps are skipped. On the other hand, if it is determined that the state in which ΔZ is equal to or greater than the predetermined value has continued for equal to or longer than the predetermined period of time (i.e., YES in step S16), it is determined that the hybrid vehicle V has overturned.

The predetermined period of time described above does not have to be a fixed value, but may be adjusted according to the amount of ΔZ (i.e., the inclination of the hybrid vehicle V). More specifically, the predetermined period of time may be set shorter when the inclination of the hybrid vehicle V is large. In this case, even if the period of time during which ΔZ is deviating by the predetermined value or more is a relatively short period of time, it will be determined that the hybrid vehicle V has overturned and is undrivable. Therefore, if the hybrid vehicle V is so far inclined that it is inconceivable that the hybrid vehicle V will recover, it will be determined at a relatively early stage that the hybrid vehicle V is undrivable.

On the other hand, the predetermined period of time may be set longer when the inclination of the hybrid vehicle V is small. In this case, if the period of time during which ΔZ is deviating by the predetermined value or more has continued for a sufficiently long period of time, it will be determined that the hybrid vehicle V has overturned and is undrivable. Therefore, if the amount that the hybrid vehicle V is inclined is small enough so that it is conceivable that the hybrid vehicle V will likely recover, it will not be determined that the hybrid vehicle V is undrivable unless a relatively long period of time passes.

As described above, the rollover determining portion 16 determines rollover using the inclination of the hybrid vehicle V. However, this kind of determining method is only an example. Rollover of the hybrid vehicle V may also be determined using another method. For example, the rollover determining portion 16 may also determine rollover of the hybrid vehicle V using information about whether driving wheels of the hybrid vehicle V are continuing to be driven without contacting the road surface, or whether they are contacting an obstacle.

If it is determined in the rollover determining portion 16 that the hybrid vehicle V is overturned, it is then determined by the system stopping portion 17 whether the rotation speed of the motor-generator MG is equal to or greater than a predetermined rotation speed (step S17). The predetermined rotation speed is a threshold value for determining whether the rotation speed of the motor-generator MG is high enough to cause a case in terms of safety. One conceivable case in terms of safety would be if the rotation speed of the motor-generator MG were maintained at a high speed even after the hybrid vehicle V overturns and becomes undrivable, and as a result, the driving wheels of the overturned hybrid vehicle V continued to spin, thereby impeding an attempt of a person to escape from the vehicle cabin or efforts by a rescuer, for example. Also, even if the driving force is not output, if high voltage for driving the motor-generator MG continues to be applied, electrical shock may ensue or there may be discharge sparks.

If it is determined that the rotation speed of the motor-generator MG is not equal to or greater than the predetermined rotation speed (i.e., NO in step S17), it is determined that the likelihood of the case described above occurring is low, so the subsequent steps are skipped. On the other hand, if it is determined that the rotation speed of the motor-generator MG is equal to or greater than the predetermined rotation speed (i.e., YES in step S17), it is determined that the likelihood of the case described above occurring is high, so the system stopping process is executed by the system stopping portion 17 (step S18).

In the system stopping process, a command value for the motor-generator MG is changed to a value that makes the rotation speed target value less than a predetermined rotation speed. Also, the motor-generator MG is mechanically decelerated by the MG mechanical brake 9. As a result, the rotation speed of the motor-generator MG is reduced to less than the predetermined rotation speed, so that the hybrid vehicle V is able to be placed in a safer state.

In the system stopping process, a filter capacitor in the PCU 7 is also discharged. Further, the SMR is cutoff and the power supply path from the battery 8 to the motor-generator MG is interrupted. As a result, relatively high voltage for driving is able to be prevented from continuing to be applied to the motor-generator MG.

As a result, according to the safety control routine executed by the ECU 10, even if the hybrid vehicle V ends up overturning during automated driving, the safety of occupants and rescuers thereafter is able to be better ensured. If the driver is performing a driving operation in the hybrid vehicle V, the driving operation would stop when the hybrid vehicle V becomes undrivable, so the rotation speed of the motor-generator MG would probably decrease automatically to the predetermined rotation speed or below. However, during automated driving, the motor-generator MG is operated without any operation by the driver, so even if the hybrid vehicle V becomes undrivable, there is a possibility that the rotation speed of the motor-generator MG will be maintained. Therefore, the safety control routine described above is extremely effective in the hybrid vehicle V that is capable of realizing automated driving.

<Predictive Safety Control Routine>

Next, a predictive safety control routine executed by the ECU 10 that is the vehicle control apparatus according to this example embodiment will be described with reference to FIG. 6. Here, FIG. 6 is a flowchart illustrating the predictive safety control routine executed by the vehicle control apparatus according to this example embodiment.

Figure 6:
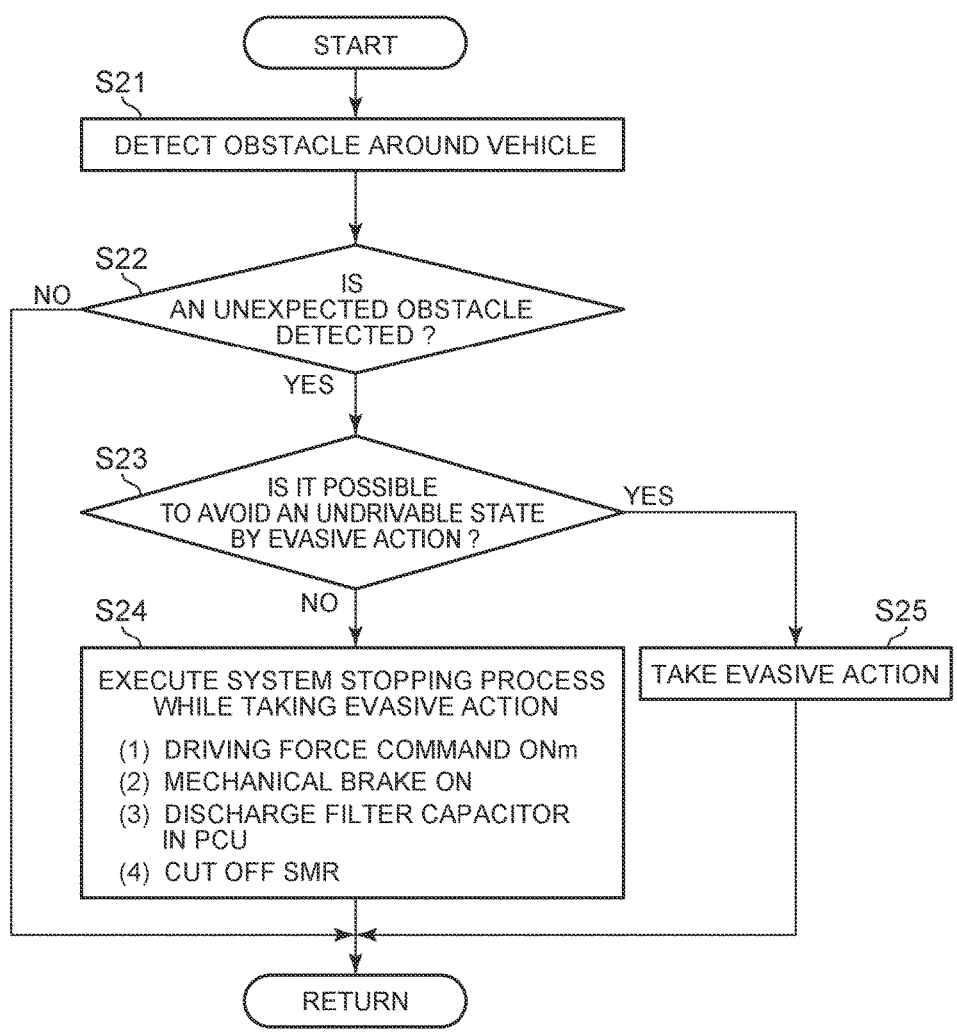
FIG. 6 is a flowchart illustrating a predictive safety control routine executed by the vehicle control apparatus according to the example embodiment.

As shown in FIG. 6, the ECU 10 may predict that the hybrid vehicle V will become undrivable during the automated driving control routine, and execute a predictive safety control routine (i.e., a safety control routine that is executed before the hybrid vehicle V actually becomes undrivable).

In the predictive safety control routine, first an obstacle around the hybrid vehicle V is detected by the external situation recognizing portion 12 (step S21). Then it is determined whether the detected obstacle is an unexpected obstacle (step S22). An unexpected obstacle is an obstacle that is unable to be predicted beforehand from map data and the like, such as an oncoming vehicle that has veered over from the opposite lane, or a pedestrian rushing into the street. The unexpected obstacle is detected from an image captured by a camera or the detection results of a sensor or the like.

If an unexpected obstacle is not detected (i.e., NO in step S22), the subsequent steps are skipped. On the other hand, if an unexpected obstacle is detected (i.e., YES in step S22), then it is determined whether it is possible to avoid the hybrid vehicle V from becoming undrivable by taking evasive action (step S23). That is, if an unexpected obstacle is detected, the hybrid vehicle V is controlled by the driving control portion 15 so as to take some sort of evasive action (e.g., execute brake control or steering angle control or the like), and it is determined whether a collision with the unexpected obstacle or rollover of the hybrid vehicle V is avoidable by such evasive action.

The determination described above is made using various data used for automated driving. More specifically, the determination is made considering all of the factors of the vehicle position recognized by the vehicle position recognizing portion 11, the external situation recognized by the external situation recognizing portion 12, and the driving state recognized by the driving state recognizing portion 13. Using the various data used for automated driving in this way makes it possible to accurately determine whether it is possible to avoid the hybrid vehicle V being rendered undrivable by the unexpected obstacle. In other words, without the various data used for automated driving, the determination accuracy may end up being lower. Therefore, the determination described above that uses the various data used for automated driving is extremely efficient.

If it is determined that the hybrid vehicle V is able to avoid being rendered undrivable by an unexpected obstacle by taking evasive action (i.e., YES in step S23), evasive action is taken (step S25) and collision avoidance with the unexpected obstacle or the like is realized. On the other hand, if it is determined that the hybrid vehicle V is unable to avoid being rendered undrivable by an unexpected obstacle by taking evasive action (i.e., NO in step S23), evasive action is taken and the system stopping process is executed by the system stopping portion 17 (step S24). That is, it is predicted that the hybrid vehicle V will shortly end up being in an undrivable state, and control to reduce the rotation speed of the motor-generator MG and control to stop the supply of power to the motor-generator MG are executed in advance. As a result, the hybrid vehicle V can start being placed in a safe state at an extremely early stage, so the safety of occupants and rescuers is able to be better ensured.

In a case in which the system stopping process would end up impeding the evasive action, a portion of the system stopping process may be discontinued and priority may be given to the evasive action.

As described above, with the vehicle control apparatus according to this example embodiment, the safety control process is executed using various data used for automated driving. Therefore, even if the hybrid vehicle V becomes undrivable, safety is able to be extremely well ensured.

The invention is not limited to the example embodiment described above. That is, various modifications are possible within the idea and scope of the invention interpreted from the entire specification and claims. A vehicle control apparatus with such modifications is also included in the technical scope of the invention.

What is claimed is:

1. A vehicle control apparatus that controls a vehicle that is provided with an electric motor as a power source and is able to realize an automated driving mode in which autonomous driving without input from a driver is possible, comprising:

a driving state determining portion configured to determine whether the vehicle is in a drivable state at a present time or will be in a drivable state at a point in time after a predetermined period of time has passed from the present time, based on data indicative of a positional relationship between the vehicle and a surrounding environment, that is used in the autonomous driving mode; and a rotation speed reducing portion configured to reduce a rotation speed of the electric motor when it is determined that the vehicle is in an undrivable state at the present time or will be in an undrivable state at the point in time after the predetermined period of time has passed, and the rotation speed of the electric motor is equal to or greater than a predetermined rotation speed.

2. The vehicle control apparatus according to claim 1, wherein the rotation speed reducing portion includes at least one of a command portion configured to apply a command value that makes a rotation speed target value of the electric motor less than the predetermined rotation speed, a brake that decelerates the electric motor by friction force, and an opening portion configured to disengage a relay of a drive circuit of the electric motor.

3. The vehicle control apparatus according to claim 1, wherein the undrivable state is a state in which any one driving wheel of the vehicle is not in contact with a road surface for equal to or greater than a first predetermined period of time, or a state in which the vehicle has contacted another object and been rendered undrivable.

4. The vehicle control apparatus according to claim 1, wherein the driving state determining portion is configured to determine that the vehicle is undrivable when an axis in a normal direction is deviating by a predetermined value or more, in a coordinate system based on orientation of the vehicle and a coordinate system based on a traveling road surface of the vehicle.

5. The vehicle control apparatus according to claim 4, wherein the driving state determining portion is configured to determine that the vehicle is undrivable when the state in which the axis in the normal direction is deviating by the predetermined value or more continues for a second predetermined period of time or longer.

6. The vehicle control apparatus according to claim 5, wherein the driving state determining portion is configured to shorten the second predetermined period of time the greater the deviation of the axis in the normal direction is.

\* \* \* \* \*